3,032,543
**POLYMERIZATION OF TETRAFLUORO-
ETHYLENE**
Manville Isager Bro and Ralph Courtenay Schreyer, Wilmington, Del., assignors to E. I. du Pont de Nemours and Company, Wilmington, Del., a corporation of Delaware
No Drawing. Filed Feb. 4, 1959, Ser. No. 791,038
4 Claims. (Cl. 260—92.1)

This invention relates to the polymerization of tetrafluoroethylene, and, more particularly, to the polymerization of tetrafluoroethylene in aqueous media.

The principal use of tetrafluoroethylene is in the preparation of polytetrafluoroethylene, which is a plastic of great technical importance due to its outstanding chemical resistance, temperature resistance, toughness and electrical properties. Various methods for the polymerization of tetrafluoroethylene to polytetrafluoroethylene have been described in the literature. Most polymerization techniques described employ an aqueous phase in which the polymerization is carried out with a free-radical initiator, such as an inorganic peroxygen compound or an inorganic redox catalyst system. Although tetrafluoroethylene is a very active monomer which can readily be polymerized, the polymerization of tetrafluoroethylene is subject to the disadvantage that during polymerization an extremely active growing polymer chain is formed, which will react with most organic compounds containing carbon-hydrogen bonds. As a result, the polymerization of tetrafluoroethylene in the presence of such compounds is stopped before a polymer of sufficiently high molecular weight, to be of utility as a plastic, is formed. Due to the high chemical reactivity of the growing polymer chain towards telomerizing agents, the polymerization of tetrafluoroethylene to high molecular weight polymer is made difficult by the rigid purification of the polymerization ingredients required to obtain the high molecular weight polymer. Furthermore, the high reactivity of the monomer and the growing polymer chain makes it extremely difficult to control the reaction and provide a process which gives rise to reproducible polymers in each polymerization run.

It is therefore an objective of the present invention to provide a novel tetrafluoroethylene polymerization process. It is another object of the present invention to provide a process for the polymerization of tetrafluoroethylene which results in the formation of high molecular weight polytetrafluoroethylene suitable as a plastic without the rigid requirements of purity with respect to the ingredients employed in the polymerization process. It is still a further object of this invention to provide a process for the polymerization of tetrafluoroethylene wherein the polymerization is readily controlled. Other objects will become apparent hereinafter.

The objects of the present invention are accomplished by a process which comprises contacting tetrafluoroethylene with an aqueous medium having therein dissolved at least 10% by weight of the aqueous medium of an acid selected from the class consisting of formic acid, acetic acid and inorganic acids liquid at polymerization temperature, said aqueous medium being maintained at a temperature of —40 to +30° C. and having therein dissolved a free-radical polymerization initiator. In accordance with the present invention, it was discovered that tetrafluoroethylene could be polymerized to high molecular weight polymers in the presence of specific organic acids, e.g., formic and acetic acid, and liquid inorganic acids. As a result of this discovery, it is possible to lower the polymerization temperatures to below the critical temperature of tetrafluoroethylene, i.e., 30° C., and particularly to below 0° C. As a result of the lower polymerization temperatures in the process of the present invention, the reactivity of the monomer and the growing polymer chain is decreased and thus allows the polymerization of tetrafluoroethylene to high molecular weight polymer in the presence of compounds which otherwise would act as telomerizing agents in the polymerization.

The acid additives employed in the process of the present invention comprise the inorganic acids which are liquid at polymerization temperatures and such organic acids as acetic and formic acid. It was found that these acids do not interfere in the polymerization of tetrafluoroethylene. If, however, the acid has more than two carbon atoms in the molecule, such as propionic acid or butyric acid, the polymerization of tetrafluoroethylene to high molecular weight polymers is prevented, and only low molecular weight polymers, not suitable for plastic purposes, are obtained. The inactivity of formic and acetic acid is not clearly understood, but it is believed, that the reason these two acids do not act as telogens in the polymerization is the absence of a hydrogen atom attached to a carbon atom which is $\beta$ to the carboxylic acid group. The inorganic acids which are preferred in the process of the present invention are sulfuric acid, sulfurous acid, phosphoric acid, phosphorous acid, and other inorganic acids which are liquid at polymerization temperatures. The quantity of the acid employed is not critical but should be at least sufficient to prevent the aqueous phase from freezing when the polymerization is carried out at temperatures below 0° C. In general, the concentration of acid in the reaction medium will vary from 10% to about 90% and, as a matter of fact, it is possible to employ acids in highly concentrated form with only a minimum of the aqueous phase contained in the acid as reaction media. The quantity of acidic reaction medium in the polymerization zone is in accordance with known aqueous polymerizations of tetrafluoroethylene and is not critical.

The catalysts or initiators employed to cause the polymerization of tetrafluoroethylene are, as stated hereinabove, compounds which give rise to free-radicals at the polymerization conditions. In general, all free-radical initiators, which form free-radicals in the temperature range in which the process of the present invention is carried out are suitable. The preferred catalysts employed in the process of the present invention are redox initiators which have been defined as 2 component initiators which undergo an electron transfer, i.e., one component is reduced and the other oxidized, as a result of which at least one species forms free-radicals capable of initiating polymerization. Suitable oxidizing components are peracids and salts of peracids, such as chlorates, bromates, iodates, persulfates, perborates, periodates, perchlorates and hydroxylamine. Suitable reducing components are bisulfite ions and polyvalent metal ions in their lower valence state, such as ions of titanium, iron, copper, cobalt, cerium, nickel and silver. These catalysts are preferred because the formation of free-radicals from these catalysts occurs readily at low temperatures. The quantity of the catalyst employed to obtain the high molecular weight polymer is within the range generally employed in the polymerization of tetrafluoroethylene and can vary from 0.01% to 5% by weight of the monomer, calculated on the basis of the oxidizing agent in the catalyst system. An excess of either component may be employed.

The process of the present invention is most advantageously carried out at temperatures of −40 to +30° C. Since tetrafluorothylene at atmospheric pressure is gaseous at these conditions, the polymerization is generally carried out under positive pressure ranging from 20 to 200 atmospheres. If it is desirable, the polymerization can be carried out with liquid tetrafluoroethylene since the polymerization temperatures employed are below the critical temperature of tetrafluoroethylene. The process may be carried out continuously or on a batch basis.

The invention is further illustrated by the following examples.

*Example I*

Into a 320 ml. platinum lined autoclave was charged 150 ml. of 96% sulfuric acid and 0.15 g. of sodium bisulfite. The reaction was cooled to −10° C. and charged with 36 g. of tetrafluoroethylene. The reaction mixture was agitated at a temperature of −8 to −10° C. for a period of one hour. During this period 0.5 g. of potassium bromate in 35 ml. of water was injected into the reaction vessel in 7 ml. portions at 5 minute intervals. The polymerization pressure dropped from 250 p.s.i. to 40 p.s.i. at the end of one hour. The resulting reaction mixture was filtered and the isolated polymer was washed with water and dried in a vacuum oven. The dried polytetrafluoroethylene weighed 25.5 g. and the polymer could be molded into tough dense sheets by performing at 2000 p.s.i. and sintering at a temperature of 380° C.

*Example II*

Into a 320 ml. platinum lined autoclave was charged 75 ml. of water, 37 ml. of 96% sulfuric acid, 0.2 g. of sodium bisulfite and 0.5 g. of sodium chlorate. The reaction mixture was cooled to −42° C., evacuated and then charged with 36 g. of tetrafluoroethylene. The reaction mixture was agitated at a temperature of −42° C. to −39° C. under autogenous pressure for a period of one hour. The resulting reaction mixture was warmed to room temperature, removed from the reactor, and washed with water and filtered. The filtered product was washed with water and dried in a vacuum oven. There was obtained 1.7 g. of high molecular weight polytetrafluoroethylene.

*Example III*

Into a 320 ml. platinum lined autoclave was charged 75 ml. of formic acid, 75 ml. of water and 0.1 g. of sodium bisulfite. The reaction mixture was cooled to −2° C., evacuated and charged with 60 g. of tetrafluoroethylene. The vessel was agitated at a temperature of −2° to 0° C. for a period of one hour. During this period, 0.5 g. of sodium chlorate in 35 ml. of water was injected into the reaction vessel in 7 ml. portions at 5 minute intervals. The polymerization pressure dropped from 280 to 80 p.s.i. during this period. The resulting reaction mixture was removed from the vessel and filtered. The solid polymer isolated was washed with additional water and dried in a vacuum oven. On drying there was obtained 55.8 g. of high molecular weight polytetrafluoroethylene which could be pressure-molded and free-sintered at temperatures above 350° C. into tough sheets.

*Example IV*

Into a 320 ml. platinum lined autoclave was charged 75 ml. of acetic acid, 75 ml. of water and 0.1 g. of sodium bisulfite. The reaction mixture was cooled to 4° C., evacuated and 60 g. of tetrafluoroethylene was injected. The reaction vessel was agitated for a period of one hour at a temperature of 4 to 18° C. During this time, 0.5 g. of sodium chlorate in 35 ml. of water was injected into the reactor in 7 ml. portions at 5 minute intervals. On work-up there was obtained 48.5 g. of high molecular weight polytetrafluoroethylene.

*Example V*

Into a 320 ml. platinum lined autoclave was charged 75 ml. of acetic acid, 75 ml. of formic acid and 0.35 g. of sodium chlorate. The reaction mixture was cooled to −10° C., evacuated and 50 g. of tetrafluoroethylene was injected into the reaction vessel. The vessel was agitated at a temperature of −10 to +22° C. for a period of one hour. During this period 0.21 g. of sodium bisulfite in 25 ml. of acetic acid and 25 ml. of formic acid was injected into the reaction vessel causing a pressure drop of 240 p.s.i. On work-up of the reaction mixture, using the procedure described in the preceding examples, there was obtained 42 g. of high molecular weight polytetrafluoroethylene.

*Example VI*

Into a 320 ml. platinum lined autoclave was charged 150 ml. of acetic acid and 1 ml. of a 20% aqueous solution of titanous trichloride. The reactor was cooled to 15° C., evacuated and 36 g. of tetrafluoroethylene was injected. The vessel was agitated for a period of one hour. During this period 0.2 g. of hydroxyl amine hydrochloride in 14 ml. of water was injected into the reaction vessel in two shots at 5 minute intervals. The reaction mixture was worked-up as in the preceding examples and on drying there was obtained 18.2 g. of high molecular weight polytetrafluoroethylene, which could be molded into tough dense sheets by heating a preformed sheet to a temperature above 350° C.

The examples illustrating, but not limiting, the present invention, have shown the polymerization of tetrafluoroethylene at low temperatures in the presence of acidic reaction media. The advantage of the reaction system disclosed hereinabove is that it can be employed in low temperature polymerizations where the monomer and the growing polymer chain are less sensitive to telomerizing organic compounds present in the reaction mixture. Furthermore, the polymerization of tetrafluoroethylene can be carried out in the presence of minor impurities which in other tetrafluoroethylene polymerization systems would inhibit the polymerization of tetrafluoroethylene to high molecular weight polymers. Although the reaction system has been described principally with respect to the polymerization of tetrafluoroethylene, it is to be understood that this system is also useful in the polymerization of other fluorinated monomers, such as chlorotrifluoroethylene as well as in the copolymerization of tetrafluoroethylene with other fluorinated monomers such as hexafluoropropylene, vinyl fluoride, vinylidene fluoride, chlorotrifluoroethylene and other fluorinated vinyl monomers.

We claim:
1. A process for the homopolymerization of tetrafluoroethylene to high molecular weight solid polytetrafluoroethylene, which comprises contacting tetrafluoroethylene at a temperature of −40 to 0° C. with an aqueous acidic reaction medium, said medium containing at least 10%, by weight of the aqueous phase, of an acid selected from the class consisting of formic acid and sulfuric acid, and having therein dissolved a redox polymerization initiator.

2. The process for the homopolymerization of tetrafluoroethylene to high molecular weight solid polytetrafluoroethylene, which comprises contacting tetrafluoroethylene at a temperature of −40 to 0° C., with a reaction medium of aqueous formic acid, said medium containing at least 10% by weight of the aqueous phase of formic acid and having therein dissolved a redox polymerization initiator.

3. The process for homopolymerizing tetrafluoroethylene to high molecular weight solid polytetrafluoroethylene, which comprises contacting tetrafluoroethylene at a temperature of −40° C. to 0° C. with a medium of aqueous sulfuric acid, said medium containing at least 10% by weight of the aqueous phase of sulfuric acid and having therein dissolved a redox polymerization initiator.

4. The process as set forth in claim 3 wherein the initiator is a chlorate/bisulfite system.

References Cited in the file of this patent

UNITED STATES PATENTS

| 2,393,967 | Brubaker | Feb. 5, 1946 |
| 2,394,243 | Joyce | Feb. 5, 1946 |
| 2,837,505 | Dittman et al. | June 3, 1958 |

FOREIGN PATENTS

| 583,874 | Great Britain | Jan. 1, 1947 |

OTHER REFERENCES

Dennstedt et al.: German application Ser. No. F 14785, printed Aug. 30, 1956 (KI 39c 25/01).

UNITED STATES PATENT OFFICE
CERTIFICATE OF CORRECTION

Patent No. 3,032,543                      May 1, 1962

Manville Isager Bro et al.

It is hereby certified that error appears in the above numbered patent requiring correction and that the said Letters Patent should read as corrected below.

Column 3, line 37, for "performing" read -- preforming --.

Signed and sealed this 21st day of August 1962.

(SEAL)
Attest:

ESTON G. JOHNSON                      DAVID L. LADD
Attesting Officer                      Commissioner of Patents